United States Patent [19]
Suwabe et al.

[11] Patent Number: 6,027,824
[45] Date of Patent: Feb. 22, 2000

[54] MAGNETIC HEAD WITH LOW NON-LINEAR TRANSITION SHIFT

[75] Inventors: Shigekazu Suwabe, Fukaya; Shizuyo Ueda, Hongoumachi; Fujio Tsuneda, Oyadai-machi; Ryo Goto, Moka, all of Japan

[73] Assignee: Hitachi Metals, Ltd., Tokyo, Japan

[21] Appl. No.: 09/095,721

[22] Filed: Jun. 11, 1998

[30] Foreign Application Priority Data

Jun. 17, 1997 [JP] Japan .................................... 9-160133

[51] Int. Cl.[7] ....................................................... B05B 15/00
[52] U.S. Cl. .......................... 428/682; 427/131; 427/132; 428/336; 428/693; 428/697; 428/699; 428/701; 428/702; 428/704; 428/900; 428/928
[58] Field of Search ..................................... 427/131, 132; 428/336, 693, 697, 699, 701, 702, 704, 900, 928, 682

[56] References Cited

FOREIGN PATENT DOCUMENTS 6-60320 3/1994 Japan .

OTHER PUBLICATIONS

"Recording Characteristics of a Head with Higher Saturation Flux Density on the Trailing Edge Pole", Tatsuaki ISHIDA et al., *IEEE Transactions on Magnetics*, vol. 32, No. 1, Jan. 1996; pp. 178–183.

*Primary Examiner*—Bernard Pianalto

[57] ABSTRACT

A magnetic head with low non-linear transition shift, excellent recording capability at high-frequency bands and good reproduction efficiency is disclosed.

A second metallic magnetic layer of an FeMN system (M : at least one element selected from the group consisting of Ti, Zr, Hf, Nb, Ta and Cr) is formed on the surface facing the gap of the leading-side magnetic core of the magnetic head. On the surface facing the gap of the trailing-side magnetic core of the magnetic head provided is a first metallic magnetic layer of an FeMN system (M : at least one element selected from the group consisting of Ti, Zr, Hf, Nb, Ta and Cr) having a higher saturation magnetic flux density than the second metallic magnetic layer. These two cores are butted against each other via a non-magnetic material and bonded with bonding glass.

9 Claims, 6 Drawing Sheets

EXAMPLE OF THE INVENTION
Bs : C/I = 1.2/1.5T (a)

COMPARATIVE EXAMPLE
Bs : C/I = 1.5/1.5T (b)

MAGNETIC HEAD WITH LOW NON-LINEAR TRANSITION SHIFT

BACKGROUND OF THE INVENTION

1. Field of the Invention

This invention relates to a magnetic head usable for magnetic recording devices, such as magnetic disk devices.

2. Description of the Related Art

Recording density in magnetic recording has been increasing at an annual rate of 60% since the beginning of the 1990s due mainly to the commercial availability of magnetoresistive (MR) heads as magnetic heads, and to the adoption of partial response maximum likelihood (PRML) as a signal processing method.

The metal-in-gap head (hereinafter referred to as MIG head for short), on the other hand, which is manufactured by forming metallic magnetic layers with high saturated magnetic density on both sides of a magnetic gap between ferrite cores with a sputtering process, has been also enjoying an increasing demand due to its low cost and ample availability, and as a result of technological improvements, such as increased saturation magnetic flux density of the metallic magnetic layers.

The MIG head has also succeeded in achieving a surface recording density of 600 Mb/in$^2$ by using in conjunction with PRML. With the MIG heads, metallic magnetic layers formed on both sides of the gap are made of the same material, that is, FeAlSi with a saturation magnetic flux density of about 1.1 T(Tesla). More recently, however, the saturation magnetic flux density of metallic magnetic layers for MIG heads has been substantially improved as the material has been switched from conventional FeAlSi to FeTaN having a saturation magnetic flux density of 1.5 T. As a result, recording magnetic field intensity has been improved, and recording properties for high coercive-force medium have also been improved accordingly, leading to higher density recording.

With the introduction of PRML as a signal processing method, linear recording density has been substantially increased, compared with the conventional peak detection method, bringing about the problem of non-linear transition shift (NLTS for short), in which recorded magnetization transition point is shifted from a predetermined location.

It is generally believed that there are the following five phenomena as to NLTS during magnetic recording:

(1) DC erasing effect

When a magnetic recording medium has been DC-erased prior to writing, whether the direction of magnetization during writing is in the same direction as, or in the opposite direction to, the DC-erasing direction determines the ease or difficulty of magnetization. The flux reversal or magnetization transition in the direction opposite to DC erasing direction tends to be delayed.

(2) One-bit before effect

When there is a flux reversal one-bit before the location where data is written, the written flux reversal is advanced by the influence of the preceding flux reversal.

(3) Two-bit before effect

When there is a flux reversal two-bits before the location where data is written, the written flux reversal is shifted. The advance shift occurs if the flux reversal at a location two-bits before is in the same direction as the flux reversal at the current location, and the delay shift occurs if in the opposite direction to the flux reversal at the current location.

(4) Broadening effect

When there is a flux reversal one-bit before data is written, the gradient of magnetic field is reduced due to the demagnetizing effect, leading to the increased width of magnetization transition shift.

(5) Partial erasure

When there is a flux reversal one-bit before or after the current location, the amplitude is reduced as a result of mutual interference. When there are flux reversals one-bit both before and after the current location, the amplitude is reduced by a factor of two.

NLTS has a great effect on error rate in the PRML circuit (signal processing). The conventional data restoration method by detecting peak locations does not greatly affect error rate so long as the peak shift is within the interval of one bit. Data restoration in the PRML circuit, on the other hand, requires the peaks be accurately positioned at the location they must be. Whereas a linear shift can therefore be corrected by an equivalent circuit, a non-linear transition shift (NLTS) involving a large amount of shift (more than 30%) due to its non-linearity would degrade error rate because it does not permit compensation by an equivalent circuit.

When a recording magnetic field leaked from the magnetic poles of the magnetic head spreads broadly, the magnetization transition region (flux reversal region) is broadened when the data are written into the recording medium. This causes the location of peaks being detected to change, or the peak height (reproduction output) to lower, resulting in a phenomenon close to (4) above and an increase in NLTS. As a result, error rate in the PRML, circuit deteriorates; the closer the intervals of bits and the higher the recording density, the more remarkably does this phenomenon occur. To cope with this, various measures, including changing the shape of the core, have been taken to make the recording field that leaks from the magnetic poles of the magnetic head sharper or steeper.

A magnetic head slider is often used as a magnetic head for recording and reproducing information on recording media. The magnetic head slider normally has two parallel flying rails on a surface facing a recording media. A slit is formed on one of the flying rails in the rear of the slider, and the core tip of the magnetic head is inserted into the slit and fixed with bonding glass.

The core tip comprises an I-shaped core (I core) and a C-shaped core (C core); both being made of an oxide magnetic material, such as ferrite, and opposing with each other with a magnetic gap between them. Metallic magnetic layers made of the same material are formed on the surfaces facing the magnetic gap of the I and C cores. The metallic magnetic layer on the I core is butted against the metallic magnetic layer of the C core, facing each other, and bonded together with bonding glass. On the core tip wound is a wire winding to record and reproduce signals.

Since the I core and the C core are disposed facing each other with a gap between them, the magnetic flux density of the metallic magnetic layer on the I core is higher at the location they face each other than that of the metallic magnetic layer of the C core. As the recording current increases, the metallic magnetic layer on the I core is apt to be saturated well before the metallic magnetic layer on the C core. This causes widened recording magnetic field and recording demagnetization, lowering both reproduction output and overwrite characteristics, and increasing NLTS. This phenomenon appears remarkably with increases in linear recording density as a result of the application of PRML.

SUMMARY OF THE INVENTION

This invention is intended to overcome the aforementioned problems inherent in the prior art. It is an object of this invention to provide a magnetic head having improved overwrite characteristics on a high coercive-force medium at high recording density, and low NLTS.

A magnetic head with low non-linear transition shift according to this invention comprises;

two magnetic cores made of single-crystal ferrite which face each other with a magnetic gap therebetween, a first metallic magnetic layer, having thickness equal to or more than 1.5 $\mu$m and equal to or less than 7.5 $\mu$m, being disposed on one of the magnetic cores and adjoining the magnetic gap and a second metallic magnetic layer, having thickness equal to or more than 1.5 $\mu$m and equal to or less than 7.5 $\mu$m, being disposed on the other of the magnetic cores and adjoining the magnetic gap;

wherein 1.4 T$\leq$Bs1$\leq$1.8 T, 1.2 T$\leq$Bs2$\leq$1.6 T and

Bs1-Bs2$\geq$0.2 T;

where

Bs1: saturation magnetic flux density of the first metallic magnetic layer and Bs2: saturation magnetic flux density of the second metallic magnetic layer.

In the magnetic head with low non-linear transition shift according to this invention, the first metallic magnetic layer may have a composition of Fex1My1Nz1 and the second metallic magnetic layer may have a composition of Fex2My2Nz2, where Fe: iron, M: at least one element selected from the group consisting of Ti, Zr, Hf, Nb, Ta and Cr, N: nitrogen, x1, y1, z1, x2, y2 and z2 are atomic percent and satisfy the following relationships:

65$\leq$x1$\leq$87,

2$\leq$x1-x2$\leq$5,

5$\leq$y1$\leq$15,

5$\leq$y2$\leq$15,

8$\leq$z1$\leq$20,

8$\leq$z2$\leq$20, x1=100-(y1+z1), x2=100-(y2+z2).

In the magnetic head with low non-linear transition shift according to this invention, it is preferable that the thickness t1 of the first metallic magnetic layer is less than that t2 of the second metallic magnetic layer. And it is more preferable that 1.5 $\mu$m$\leq$t1$\leq$3.5 $\mu$m and 3.5 $\mu$m$\leq$t2$\leq$7.5 $\mu$m, where t1: thickness of the first metallic magnetic layer and t2: thickness of the second metallic magnetic layer.

It is preferable that the second metallic magnetic layer used in this invention was heat-treated before the glass bonding of the magnetic core tip.

In the invention it is more preferable that the magnetic head meets the condition of 1.2$\leq$(Bs2×t2)/(Bs1×t1)$\leq$2.5.

DESCRIPTION OF THE PREFERRED EMBODIMENTS

Figure 1:
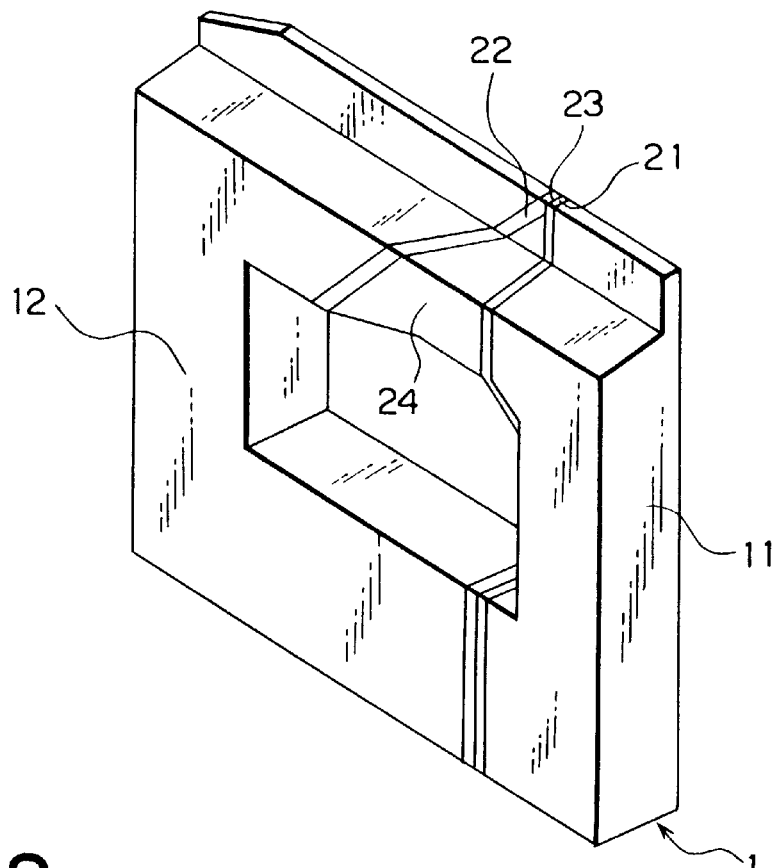
FIG. 1 is a perspective view illustrating a magnetic head, particularly a core tip thereof, in an embodiment of this invention.

FIG. 1 is a perspective view illustrating a core tip of a magnetic head embodying this invention. In this core tip 1, numeral 11 denotes an I-shaped core (I core), 12 a C-shaped core (C core); the cores 11 and 12 are each made of an oxide magnetic material, such as ferrite. A single-crystal ferrite of Mn—Zn ferrite is a preferable oxide magnetic material. A first metallic magnetic layer 21 is formed on the surface of the core 11 facing the gap. On the surface of the core 12 facing the gap, on the other hand, formed is a second metallic magnetic layer 22 having a saturation magnetic flux density that is lower than that of the first metallic magnetic layer but higher than that of the ferrite. The thickness of the first and second metallic magnetic layers is 1.5~7.5 $\mu$m. The I core 11 and the C core 12 are bonded together with bonding glass 24 in such a matter that the first and second metallic magnetic layers 21 and 22 face each other with a non-magnetic layer 23 forming a magnetic gap between them.

Figure 2:
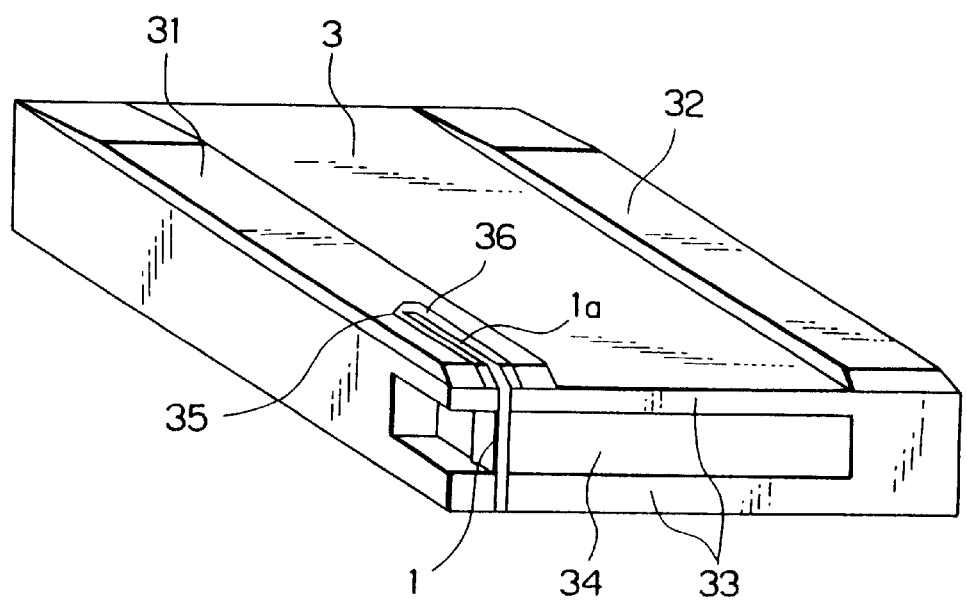
FIG. 2 is a perspective view illustrating a magnetic head slider.

A magnetic head is formed by incorporating the core tip 1 in the slider shown in FIG. 2. In the figure, numeral 3 is a slider made of non-magnetic ceramics, etc. Flying rails 31 and 32 are formed in parallel with each other on the surface of the slider 3 facing the medium. Numeral 33 is a trailing end of the slider 3, on which a winding groove 34 is formed in such a manner as to orthogonally intersecting with the flying rails 31 and 32. Numeral 35 is a slit formed on the trailing end of the flying rail 31 and extending in the longitudinal direction of the flying rail 31. The core tip 1 is inserted and fixed in the slit 35 with glass 36 in such a manner as to make the front gap surface 1a on a level with the surface facing the medium.

Figure 3:
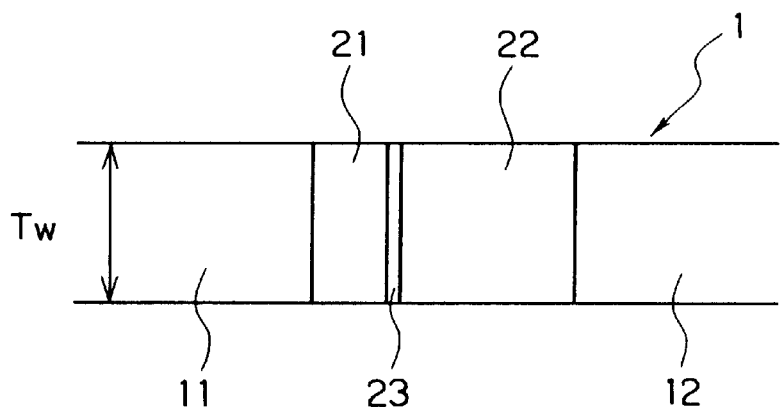
FIG. 3 is an enlarged view illustrating a front gap portion in a magnetic head embodying this invention.

FIG. 3 is an enlarged view of the front gap surface 1a of the core tip 1. The first and second metallic magnetic layers 21 and 22 are disposed facing each other with a magnetic gap 23 between them. A track width Tw is formed in such a manner that the cores 11 and 12, made of ferrite, and the first and second metallic magnetic layers 21 and 22 are machined all in the same width. The C core 12 with the second metallic magnetic layer 22 is disposed on the leading side of the magnetic head slider 3, whereas the I core 11 with the first metallic magnetic layer 21 on the trailing side thereof.

The saturation magnetic flux density is controlled to a predetermined range by controlling the compositions of the first and second metallic magnetic layers and subjecting both to the optimum heat treatment. In this invention, in which a high-Bs layer is provided on the I core on the trailing side as the first metallic magnetic layer and a low-Bs layer is provided on the C core on the leading side as the second metallic magnetic layer, the amount of magnetic flux is controlled by the low-Bs magnetic layer on the leading side. Consequently, excess flux is prevented from being fed to the trailing side, and the magnetic layer is not saturated since a high-Bs layer is used as the magnetic layer on the trailing side. As a result, the widening of recording field and the recording demagnetization are prevented, and NLTS is reduced.

To ensure this effect, the relationship between the C core and the I core, that is, between the Bs of the magnetic layers on the leading and trailing sides is important.

When the difference in the Bs of the C and I cores is small, the tip of the I core is apt to be readily saturated due to the flux supplied from the C core side to the I core side. Consequently, the Bs of the I-core magnetic layer must be larger to a certain degree than the Bs of the C-core magnetic layer; a difference of over 0.2 T is needed to obtain a remarkable effect. In this invention, therefore, the Bs1 of the metallic magnetic layer on the I core side and the Bs2 of the metallic magnetic layer on the C core side are set as follows; $1.4\ T \leq Bs1 \leq 1.8\ T$, $1.2\ T \leq Bs2 \leq 1.6\ T$, and $Bs1-Bs2 \leq 0.2\ T$.

Furthermore, NLTS can be reduced by optimizing the combination of the thicknesses of the first and second metallic magnetic layers. The thickness t1 of the first metallic magnetic layer should preferably be less than the thickness t2 of the second metallic magnetic layer.

When the thickness of the metallic magnetic layer on the I core side is thin, the magnetic layer in the vicinity of the I-core gap would be apt to be saturated, leading to an increase in NLTS. When the thickness of the magnetic layer on the I-core side is thick, on the contrary, reproduction output would increase, but field intensity would also increase over a wide range at the same time. As a result, the steepness of the gradient of recording magnetic field would be lost and NLTS would increase.

When the thickness of the metallic magnetic layer on the C-core side is thin, head efficiency would deteriorate due to the shortage of the magnetic layer portion that has high permeability. As a result, reproduction output would be lowered and the gradient of the overwrite with respect to the recording current would deteriorate, increasing NLTS accordingly. When the thickness of the metallic magnetic layer on the C-core side is too thick, on the other hand, reproduction output would increase to a certain extent, but too thick the layer thickness would cause permeability to lower due to eddy-current loss. As a result, reproduction output would lower, and the gradient of the overwrite with respect to the recording current would be slowed, leading to an increase in NLTS.

The term "overwrite" used herein refers to the magnitude of a residual low-frequency signal output when a signal of a high frequency (55 MHz, for example) has been overwritten on a signal recorded with a low frequency (11 MHz, for example). Assuming that a signal output recorded at a low frequency is Vo, and a residual low-frequency signal after overwriting is V, the overwrite is expressed by 20 log V/Vo. "The gradient of the overwrite with respect to the recording current" refers to the gradient of the overwrite, 20 log V/Vo, with respect to the recording current at high frequencies.

The above tendency depends on the balance between the Bs and thickness of the magnetic layers of the C and I cores. To obtain a magnetic head having small NLTS, good reproduction output and excellent recording characteristics, it is desirable that the saturation magnetic flux density Bs of metallic magnetic layers satisfies the above conditions, and the thickness of the magnetic layer on the I-core side is such that $1.5\ \mu m \leq t1 \leq 3.5\ \mu m$, and the thickness of the magnetic layer on the C-core side is such that $3.5\ \mu m \leq t2 \leq 7.5\ \mu m$.

To ensure a smaller NLTS value, in particular, it is desirable to satisfy the relationship that $1.2 \leq (Bs2 \times t2)/(Bs1 \times t1) \leq 2.5$.

In manufacturing the core tip used for the magnetic head of this invention, metallic magnetic layers are formed by sputtering on the surfaces facing the gap of the C and I bars, made of an oxide magnetic materials, such as ferrite. The metallic magnetic layer is an Fe—M—N alloy (M: at least one element selected from the group consisting of Ti, Zr, Hf, Nb, Ta and Cr); the first metallic magnetic layer formed on the I bar should preferably be $Fe_{x1}M_{y1}N_{z1}$ (where $65 \leq x1 \leq 87$, $5 \leq y1 \leq 15$, $8 \leq z1 \leq 20$, $x1=100-(y1+z1)$), and the second metallic magnetic layer on the C bar should preferably be $Fe_{x2}M_{y2}N_{z2}$ (where $2 \leq x1-x2 \leq 5$, $5 \leq y2 \leq 15$, $8 \leq z2 \leq 20$, $x2=100-(y2+z2)$). The metallic magnetic layers as sputtered are amorphous, and their saturation magnetic flux density, Bs, and permeability, $\mu$, are extremely low. The saturation magnetic flux density and permeability are therefore increased by precipitating fine crystals by heat treatment at higher than 400° C. At heat-treatment temperatures exceeding 600° C., coercive force, Hc, may increases and permeability may reach less than 2000.

The C and I bars with sputtered metallic magnetic layers are glass-bonded by applying bonding glass between the layers, and heating them to 400~600° C., or more preferably to 450~550° C., under pressure while facing the metallic magnetic layers to each other. The glass-bonded I and C bars are cut to a predetermined length to obtain a core tip as shown in FIG. 1. The metallic magnetic layers are heat-treated by the heat applied during the glass bonding to precipitate fine crystals to have necessary magnetic characteristics.

The second metallic magnetic layer formed on the C bar, however, should preferably be heat-treated prior to glass bonding. The second metallic magnetic layer has an apex between the surface facing the gap and the surface away from the gap. When the second metallic magnetic layer is heat-treated, the volume of the layer may be shrunk by its phase deformation, resulting in sagged apex or microcracks on the bonding glass. To avoid this, it is recommended to subject the second metallic magnetic layer to preheat treatment at 450~600° C. prior to glass bonding to cause phase deformation, and to polish the layer before glass bonding.

The optimum temperature for the heat treatment of the metallic magnetic layers depends on the Fe content of the layers. When the Fe content is high, the optimum temperature tends to be a low level, and when the Fe content is low, the optimum temperature tends to be a high level. This invention makes it desirable that the first metallic magnetic layer should have a little higher Fe content than the second metallic magnetic layer. That is, the optimum temperature for the heat treatment of the second metallic magnetic layer is higher than the optimum heat-treatment temperature for the second metallic magnetic layer. During glass bonding, however, where both the metallic magnetic layers are heated to the same temperature, both layers should be heated to the lower temperature of the two optimum temperatures. This is because heating to the higher temperature of the two optimum temperatures would overheat the metallic magnetic layer having the lower optimum temperature, causing a grain growth that would lead to increased coercive force. It is recommendable, therefore, to preheat the C bar (C core) with the second metallic magnetic layer having the higher optimum heat-treatment temperature to that temperature.

Experiment 1

Figure 4:
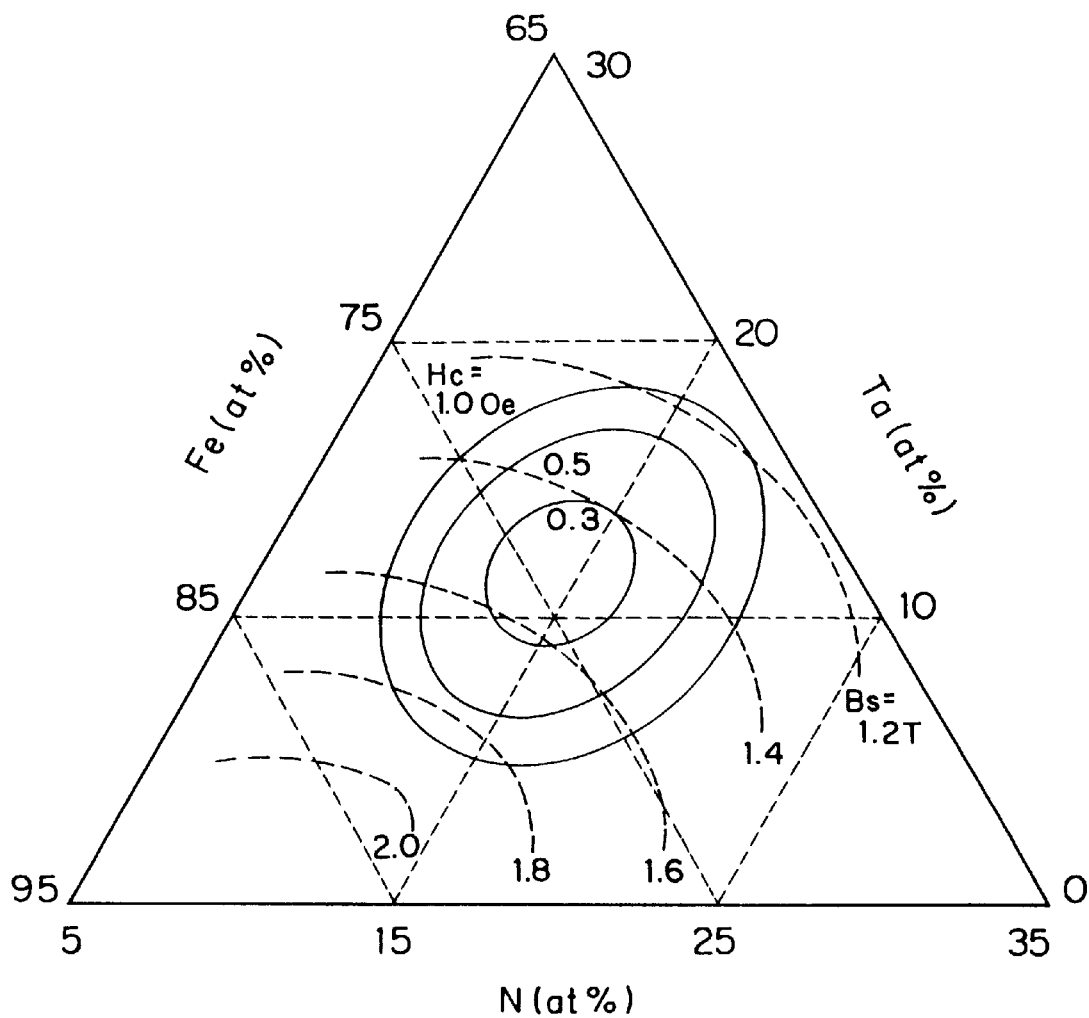
FIG. 4 is a map illustrating the relationship between the characteristics and layer composition of a metallic magnetic layer used in the magnetic head embodying this invention.

FIG. 4 shows the relationship among the layer composition of a composition type FeMN layer using Ta as M, the saturation magnetic flux density, Bs, and the coercive force, Hc. In the figure, the results of heat treatment at 550° C. The figure reveals that Bs changes almost in accordance with the amount of Fe. It is known that the magnetic characteristics of the layer are related to the crystal structure. Soft magnetic properties can be obtained as the TaN formed by heat treatment inhibits the growth of Fe crystal grains. With a low TaN content, crystal grains grow, degrading soft magnetic properties. When TaN exists excessively in the crystal grain boundary of Fe, insufficient magnetic exchange coupling among Fe crystal grains causes anisotropic dispersion to increase, degrading soft magnetic properties. As is apparent from FIG. 4, this magnetic layer can be satisfactorily applied to magnetic heads, judging from the fact that Hc exhibits a good characteristic of less than 0.5 Oe over a range of 5~15 at % of Ta, 8~20 at % of N, and the balance of Fe, in which Bs is 1.2~1.8 T. Furthermore, soft magnetic properties are optimized and Hc is improved to less than 0.3 Oe, and Bs to less than 1.4~1.6 T over a range of 8~12 at % of Ta, 12~17 at % of N, and the balance of Fe.

Consequently, layers having this composition range can be used as first and second metallic magnetic layers in this invention because they exhibit good soft magnetic properties over a range of 1.2~1.8 T.

Experiment 2

Magnetic heads as shown in FIG. 1 each using a first metallic magnetic layer 21 of a thickness of 2 $\mu$m and a second metallic magnetic layer 22 of a thickness of 5 $\mu$m, both having saturation magnetic flux densities shown in Table 1 were manufactured, and evaluated for electromagnetic conversion characteristics (NLTS, overwrite, reproduction output) as flying type magnetic heads for hard disk drives. The evaluation results are shown in Table 1. The track width Tw of the head was 4 $\mu$m, and the gap length Gl was 0.22 $\mu$m.

Evaluation conditions were:

Flying height: 30 nm

Peripheral speed: 24 m/sec

Overwrite frequency: LF=11 MHz, HF=55 MHz

No. of turns of coil: 24 turns

Recording current: 10 mA

Medium coercive force: Hc=2000 Oe

Medium characteristics: Br $\delta$=230 G $\mu$m

TABLE 1

|  | Bs1 (T) | Bs2 (T) | NLTS (%) | O/W (-dB) | Reproduction output (mV) |
| --- | --- | --- | --- | --- | --- |
| Com. Example 1 | 1.5 | 1.5 | 60 | 28 | 0.176 |
| Com. Example 2 | 1.5 | 1.4 | 45 | 29 | 0.186 |
| Example 1 | 1.5 | 1.3 | 28 | 30.5 | 0.208 |
| Example 2 | 1.5 | 1.2 | 25 | 30 | 0.204 |
| Com. Example 3 | 1.6 | 1.5 | 40 | 28.5 | 0.173 |
| Example 3 | 1.6 | 1.4 | 25 | 33 | 0.240 |
| Example 4 | 1.6 | 1.3 | 22 | 31.5 | 0.216 |
| Example 5 | 1.7 | 1.4 | 19 | 32 | 0.224 |
| Example 6 | 1.7 | 1.5 | 22 | 33 | 0.232 |

By forming the metallic magnetic layer 21 on the I-core side with a material having a larger saturation magnetic flux density than that of the metallic magnetic layer 22 on the C-core side, in this way, recording field is prevented from being widened without causing the metallic magnetic layers to be magnetically saturated, NLTS is reduced and overwrite characteristics and reproduction output are prevented from being lowered, even when recording current is increased.

Figure 5:
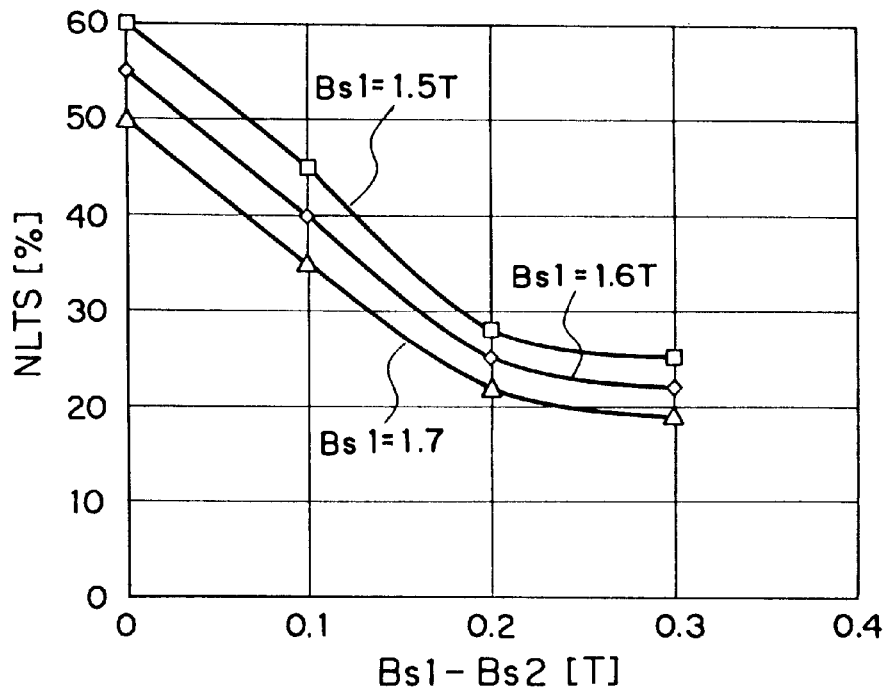
FIG. 5 is a graph illustrating the relationship between the saturation magnetic flux density and NLTS when the magnetic heads of this invention and the comparative examples are used.

The relationship between the difference between the saturation magnetic flux densities on the first and second metallic magnetic layers, Bs1–Bs2, and NLTS is summarized in FIG. 5, mainly using NLTS data in Table 1. As is apparent from FIG. 5, the larger Bs1–Bs2, the smaller tends to become NLTS in each case of Bs1 being 1.5 T, 1.6 T and 1.7 T; NLTS becomes less than 30% when the difference is more than 0.2 T. Since practically desirable values are less than 30% of NLTS, less than −30 dB of overwrite, and more than 0.200 mV of reproduction output, the difference between Bs1 and Bs2 of more than 0.2 T can satisfy these values.

Figure 6:
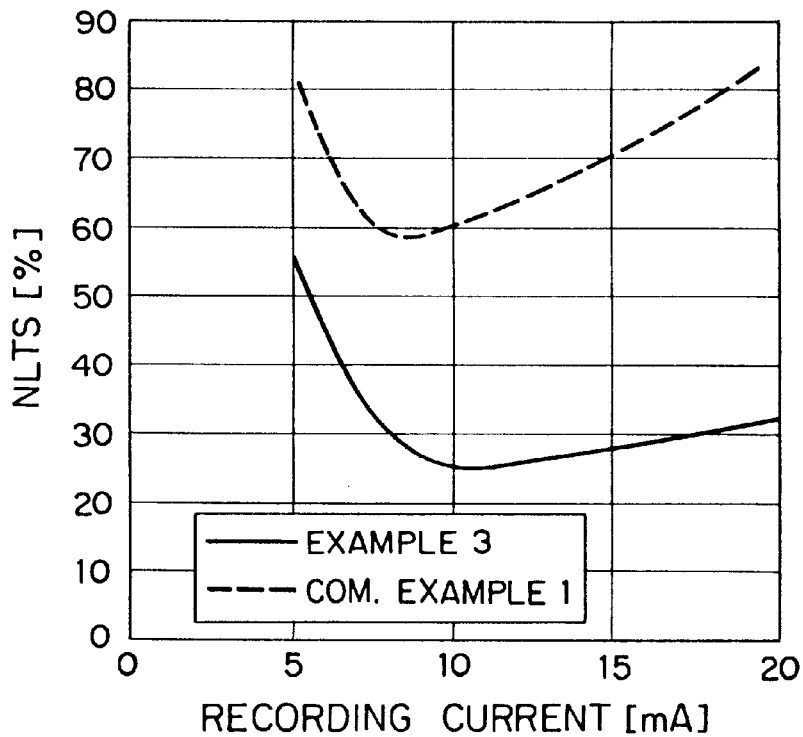
FIG. 6 is a graph illustrating the relationship between NLTS characteristics and recording current when the magnetic heads of this invention and the comparative examples are used.

The recording current dependence of NLTS was measured with Comparative Example 1 and Example 3 among the above magnetic heads, by changing the recording current from 5 mA to 20 mA. The results are shown in FIG. 6. With the head of Comparative Example 1, as the recording current exceeds 10 mA, the overwrite decreases and NLTS increases with increases in the recording current. This is attributable to that an increase in magnetomotive force causes the amount of magnetic flux flowing in the core to increase, and the magnetic layer to be saturated in the vicinity of the gap at which magnetic flux is concentrated. This results in a decrease in the overwrite and an increase in NLTS. The decrease in the overwrite and the increase in NLTS are observed particularly when the recording magnetic field is widened as a result of the saturation of the I core on the trailing side. The magnetic head embodying this invention (Example 3) shows an NLTS value as high as over 20% even when the recording current exceeds 10 mA.

Figure 7:
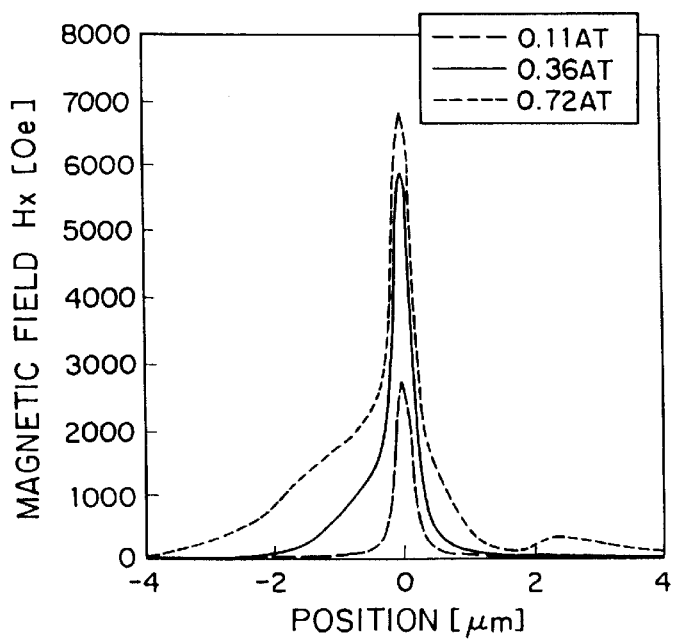
FIGS. 7($a$) and 7($b$) are (a) a graph illustrating the relationship between field distribution and magnetomotive force when the magnetic head of this invention is used, and (b) a graph illustrating the relationship between field distribution and magnetomotive force when the magnetic head of the comparative example is used.
Figure 7:
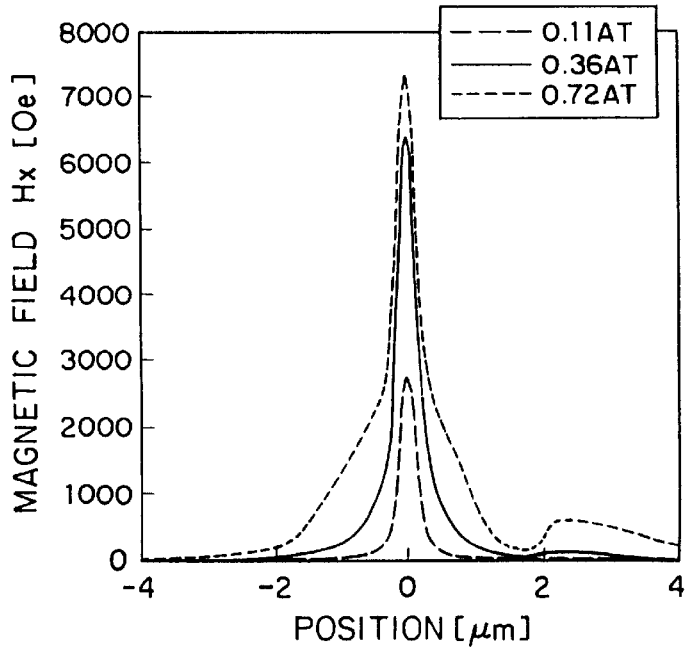
Figure 8:
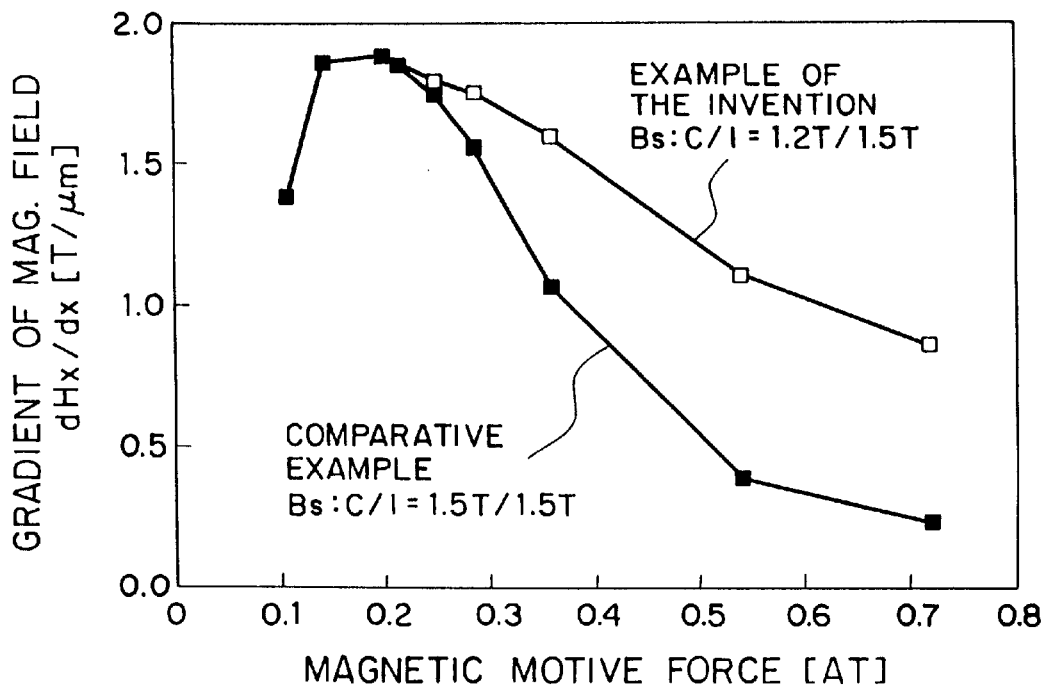
FIG. 8 is a graph illustrating the relationship between the gradient of magnetic field and magnetomotive force when the magnetic heads of this invention and the comparative example are used.

FIG. 7 shows a magnetic field distribution when the C-core and the I-core with varied saturation flux densities were combined, and FIG. 8 shows the magnetomotive force dependence of the gradient of magnetic field (at 2000 Oe) on the I-core side. The figures indicate that by applying this invention, the gradient of magnetic field on the I-core side that is the trailing side becomes steep, and that the widening degree of magnetic field is small even when magnetomotive force increases. These results suggest that NLTS decreases.

Experiment 3

Table 2 shows measurements of electromagnetic conversion characteristics when the relationship between the thickness and the saturation magnetic flux density of magnetic layer was varied.

TABLE 2

|  | t1 (μm) | Bs1 (T) | t2 (μm) | Bs2 (T) | NLTS (%) | O/W (−dB) | Reproduction output (mV) |
|---|---|---|---|---|---|---|---|
| Com. Example 4 | 1.0 | 1.5 | 5 | 1.2 | 38 | 28 | 0.176 |
| Example 7 | 1.7 | 1.6 | 5 | 1.4 | 25 | 33 | 0.230 |
| Example 8 | 2.5 | 1.5 | 4 | 1.3 | 28 | 30.5 | 0.208 |
| Example 9 | 3 | 1.5 | 6.8 | 1.2 | 27 | 30 | 0.216 |
| Com. Example 5 | 2 | 1.6 | 7.7 | 1.4 | 40 | 28.5 | 0.183 |
| Com. Example 6 | 2 | 1.6 | 3 | 1.4 | 35 | 31 | 0.184 |
| Com. Example 7 | 3.7 | 1.6 | 5 | 1.4 | 40 | 29 | 0.224 |
| Example 10 | 2.8 | 1.6 | 5.7 | 1.4 | 22 | 33 | 0.248 |
| Example 11 | 2.8 | 1.7 | 5.7 | 1.4 | 19 | 33 | 0.240 |

Figure 9:
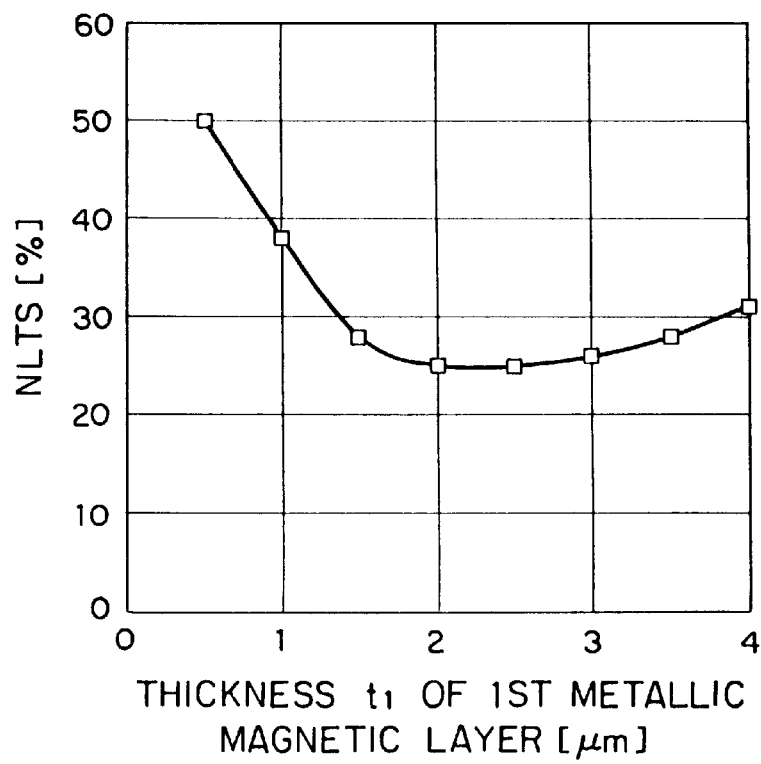
FIG. 9 is a graph illustrating the relationship between NLTS and the thickness of a first metallic magnetic layer when the magnetic heads of this invention and the comparative examples are used.

FIG. 9 shows the relationship between the thickness t1 of the first metallic magnetic layer and NLTS when Bs1 and Bs2 are 1.5 T and 1.2 T, respectively, and t2 is 5 μm. The figure reveals that NLTS shows satisfactory values less than 30% when the thickness t1 of the metallic magnetic layer 1 is within the range of 1.5 μm≦t1≦3.5 μm. The rise in NLTS with decreases in t1 is attributable to the widening of the recording magnetic field as a result of the magnetic saturation of the tip. As t1 increase, on the other hand, the intensity of recording magnetic field on the I-core side increases gradually. As a result, the steepness of the magnetic field gradient is lost, and the increasing tendency of NLTS is observed.

Figure 10:
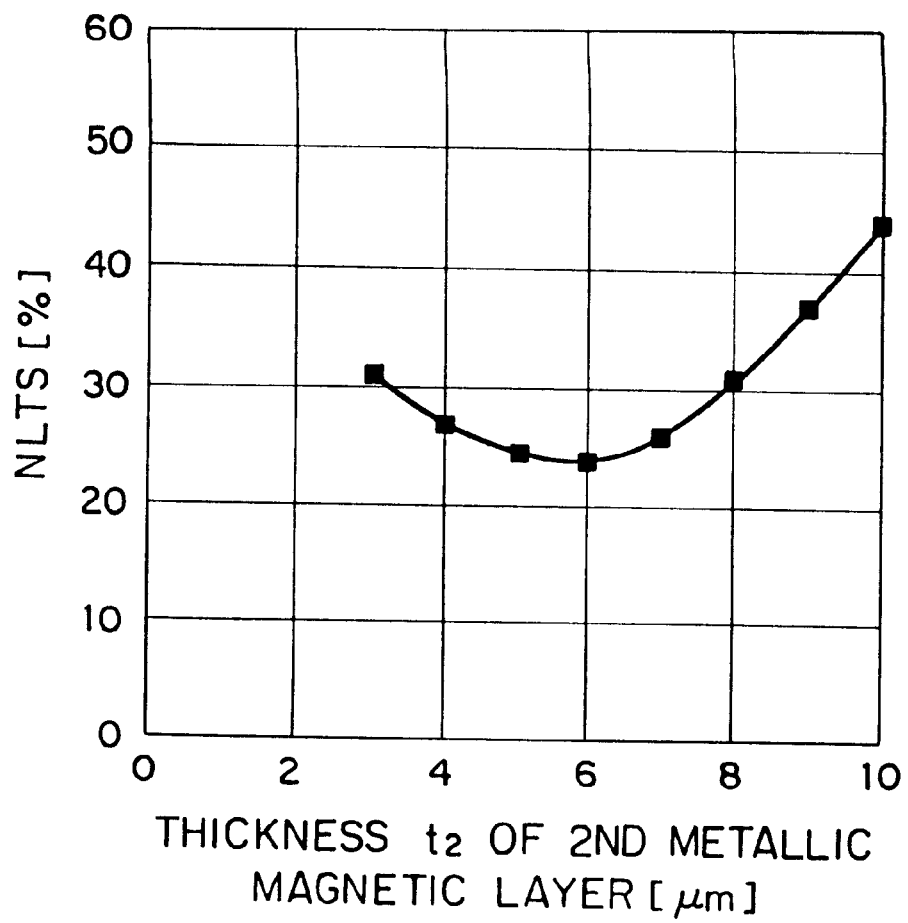
FIG. 10 is a graph illustrating the relationship between NLTS and the thickness of a second metallic magnetic layer when the magnetic heads of this invention and the comparative examples are used.

FIG. 10 shows the relationship between the thickness t2 of the second metallic magnetic layer and NLTS when Bs1 and Bs2 were 1.5 T and 1.2 T, respectively, and t1 was 2 μm. The figure indicates that the range of the thickness of the second metallic magnetic layer in which NLTS shows satisfactory values of less than 30% is 3.5 μm≦t2≦7.5 μm. When t2 is small enough, the ratio of the magnetic layer portion having a high specific permeability becomes small. Thus, it seems that the core efficiency tends to lower, causing NLTS to increase. When t2 increases, on the other hand, NLTS increases probably because the permeability of the magnetic layer is decreased due to eddy-current loss, degrading the efficiency of the core.

Experiment 4

Magnetic heads were manufactured by adding a process of heat treating only the core having the second metallic magnetic layer prior to the glass bonding of the I and C cores in the magnetic-core manufacturing process. The evaluation results of those magnetic heads are shown in Table 3. The thickness of the metallic magnetic layer was 2 μm on the I-core side and 5 μm on the C-core side. In this embodiment, preheat treatment prior to glass bonding was conducted at 450° C.

Examples 12~15 were the results without preheat treatment prior to glass bonding, and Examples 16~19 were those with preheat treatment prior to glass bonding. With any of described Bs, the magnetic heads manufactured with preheat treatment prior to glass bonding show better values in NLTS, overwrite and reproduction output.

TABLE 3

|  | Bs1 (T) | Bs2 (T) | Preheat treatment | NLTS (%) | O/W (−dB) | Reproduction output (mV) |
|---|---|---|---|---|---|---|
| Example 12 | 1.5 | 1.2 | No | 25 | 30 | 0.204 |
| Example 13 | 1.5 | 1.3 | No | 28 | 30.5 | 0.208 |
| Example 14 | 1.6 | 1.3 | No | 22 | 31.5 | 0.216 |
| Example 15 | 1.6 | 1.4 | No | 25 | 33 | 0.240 |
| Example 16 | 1.5 | 1.2 | Done | 23 | 30.5 | 0.210 |
| Example 17 | 1.5 | 1.3 | Done | 25 | 31 | 0.218 |
| Example 18 | 1.6 | 1.3 | Done | 19 | 32 | 0.226 |
| Example 19 | 1.6 | 1.4 | Done | 22 | 33 | 0.246 |

As described above, the widening of recording magnetic field due to the magnetic saturation of metallic magnetic layers can be suppressed with magnetic heads embodying this invention in which the saturation magnetic field densities Bs of metallic magnetic layers formed on the surfaces facing the magnetic gap of a pair of cores are made different and the combination of Bs values and the thicknesses of the layers is optimized. As a result, recording demagnetization, etc. can be prevented, and non-linear transition shift (NLTS) that poses problems at higher linear recording densities can be substantially reduced, and magnetic recording apparatus using MIG heads having high recording densities can be realized.

What is claimed is:

1. A magnetic head with low non-linear transition shift comprising;

two magnetic cores made of single crystal ferrite which face each other with a magnetic gap therebetween, a first metallic magnetic layer, having thickness equal to or more than 1.5 μm and equal to or less than 7.5 μm, being disposed on one of the magnetic cores and adjoining the magnetic gap and a second metallic magnetic layer, having thickness equal to or more than 1.5 μm and equal to or less than 7.5 μm, being disposed on the other of the magnetic cores and adjoining the magnetic gap;

wherein $1.4\ T \leq Bs1 \leq 1.8\ T$, $1.2\ T \leq Bs2 \leq 1.6\ T$ and $Bs1 - Bs2 \geq 0.2\ T$;

where

Bs1: saturation magnetic flux density of the first metallic magnetic layer and Bs2: saturation magnetic flux density of the second metallic magnetic layer.

2. A magnetic head with low non-linear transition shift as set forth in claim 1, wherein the first metallic magnetic layer has a composition of $Fe_{x1}M_{y1}N_{z1}$ and the second metallic magnetic layer has a composition of $Fe_{x2}M_{y2}N_{z2}$, where Fe: iron, M: at least one element selected from the group consisting of Ti, Zr, Hf, Nb, Ta and Cr, N: nitrogen, x1, y1, z1, x2, y2 and z2 are atomic percent and satisfy the following relationships:

$65 \leq x1 \leq 87$, $2 \leq x1 - x2 \leq 5$, $5 \leq y1 \leq 15$, $5 \leq y2 \leq 15$, $8 \leq z1 \leq 20$, $8 \leq z2 \leq 20$, $x1=100-(y1+z1)$, $x2=100-(y2+z2)$.

3. A magnetic head with low non-linear transition shift as set forth in claim 2, wherein the thickness t1 of the first metallic magnetic layer is less than that t2 of the second metallic magnetic layer.

4. A magnetic head with low non-linear transition shift as set forth in claim 3, wherein the first metallic magnetic layer is formed on the trailing side magnetic core and the second metallic magnetic layer is formed on the leading side magnetic core.

5. A magnetic head with low non-linear transition shift as set forth in claim 4, wherein the second metallic magnetic layer was heat-treated before the glass bonding of the magnetic cores.

6. A magnetic head with low non-linear transition shift as set forth in claim 2, wherein $1.5 \,\mu m \leq t1 \leq 3.5 \,\mu m$ and
$3.5 \,\mu m \leq t2 \leq 7.5 \,\mu m$, where t1: thickness of the first metallic magnetic layer and t2: thickness of the second metallic magnetic layer.

7. A magnetic head with low non-linear transition shift as set forth in claim 6, wherein the first metallic magnetic layer is formed on the trailing side magnetic core and the second metallic magnetic layer is formed on the leading side magnetic core.

8. A magnetic head with low non-linear transition shift as set forth in claim 7, wherein the second metallic magnetic layer was heat-treated before the glass bonding of the magnetic cores.

9. A magnetic head with low non-linear transition shift as set forth in claim 6, wherein $1.2 \leq (Bs2 \times t2)/(Bs1 \times t1) \leq 2.5$.

* * * * *

UNITED STATES PATENT AND TRADEMARK OFFICE
CERTIFICATE OF CORRECTION

PATENT NO.: 6,027,824
DATED : February 22, 2000
INVENTOR(S): Shigekazu SUWABE, et al.

It is certified that error appears in the above-identified patent and that said Letters Patent is hereby corrected as shown below:

Column 5, line 39, change "$\leq$" to --$\geq$--. (5th occur).

Signed and Sealed this

Thirteenth Day of February, 2001

*Attest:*

NICHOLAS P. GODICI

*Attesting Officer*     *Acting Director of the United States Patent and Trademark Office*